Figure 1:
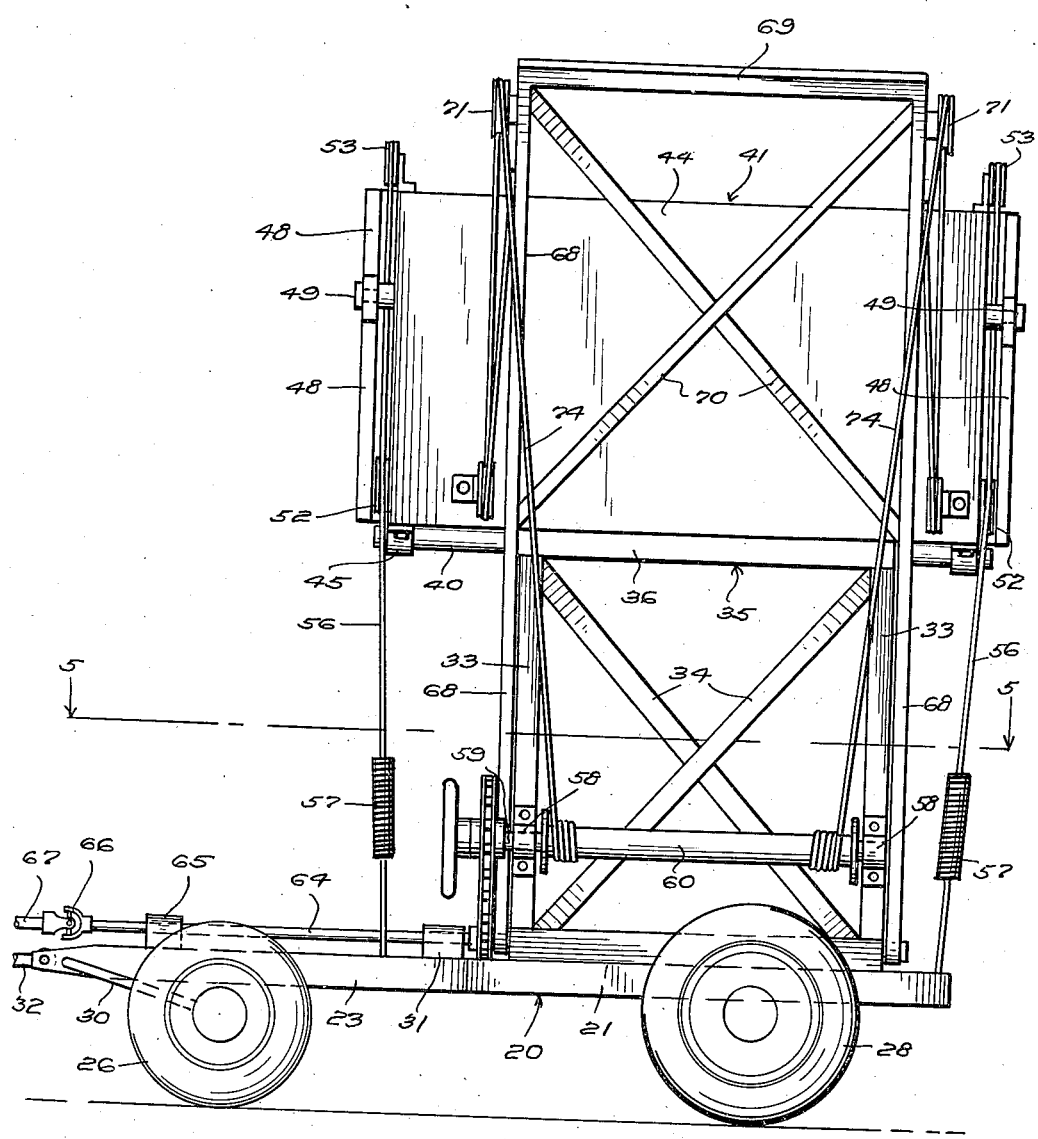

Arthur F. Rathgeber, Inventor

Aug. 30, 1949.  A. F. RATHGEBER  2,480,609
PORTABLE SILAGE RACK
Filed Nov. 16, 1945  6 Sheets-Sheet 5

Inventor
Arthur F. Rathgeber,

By Clarence A. O'Brien
and Harvey B. Jacobson
Attorneys

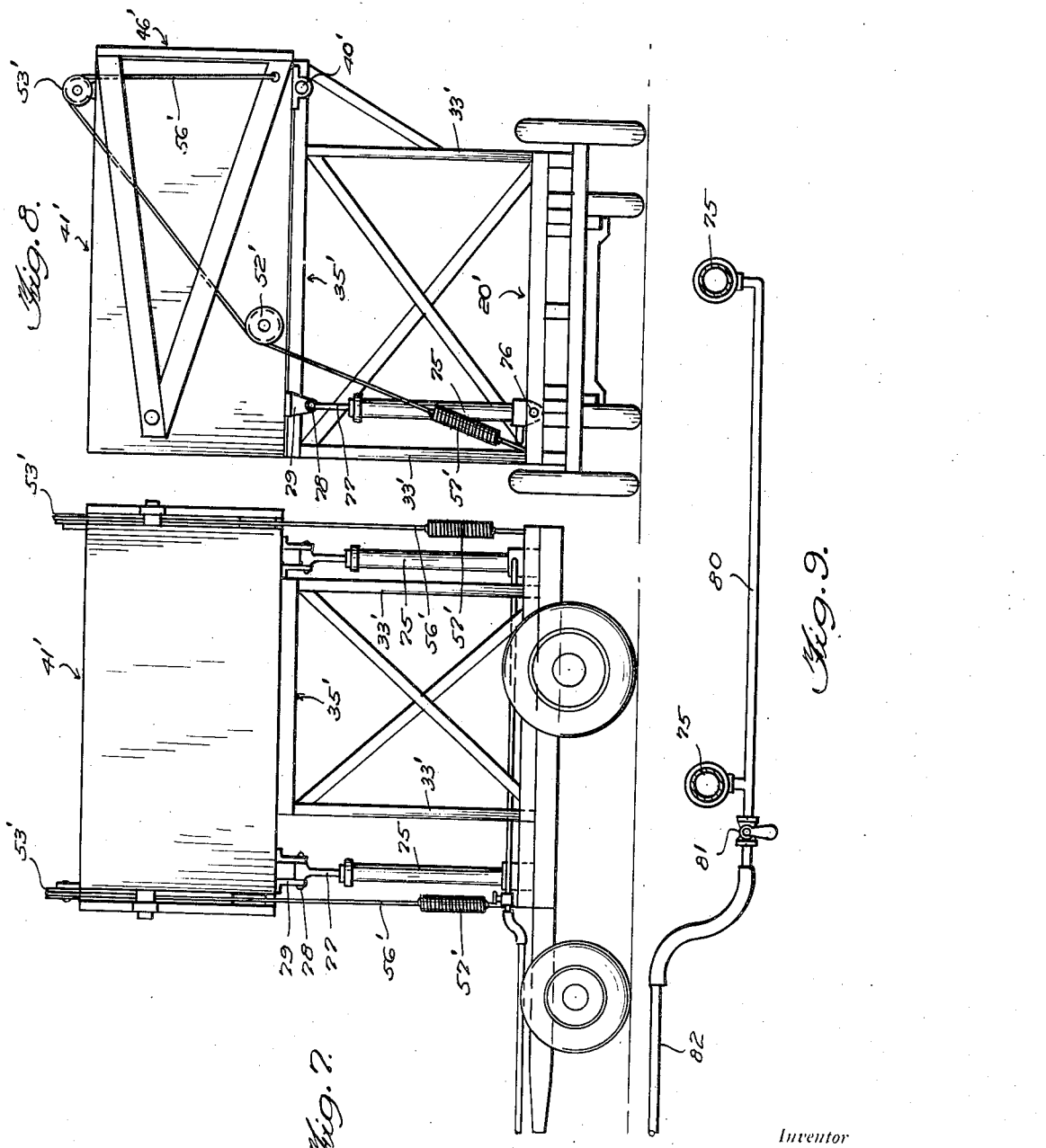

Patented Aug. 30, 1949

2,480,609

UNITED STATES PATENT OFFICE 2,480,609

PORTABLE SILAGE RACK

Arthur Fred Rathgeber, Tipton, Kans., assignor of one-half to Donald H. Hobbie, Tipton, Kans.

Application November 16, 1945, Serial No. 629,035

1 Claim. (Cl. 298—21)

This invention relates to a portable silage rack and more particularly to a receptacle adapted to be conveyed in unison with a silage cutter to receive and store the cut silage preparatory to delivery to a suitable conveyance for transportation to a silo or like storage receptacle.

The primary object of the invention is to temporarily store the cut silage, and periodically to deliver the silage to a suitable vehicle so that the silage cutting may progress uninterruptedly during the transfer of the cut material from the field to the permanent storage receptacle such as a silo.

Another object is to facilitate the discharge of the cut silage from the portable silage rack to a vehicle without interrupting the progress of the silage cutting.

The above and other objects may be attained by employing this invention which embodies among its features a wheeled trailer vehicle adapted for attachment to a silage cutter, a superstructure supported on the wheeled vehicle, a tiltable bin mounted to rotate about a horizontal axis on the superstructure for the discharge of the contents thereof, and a door closing one side of the bin through which the discharge of the silage takes place when the bin is tilted.

Other features embody means automatically to move the door to open position as the bin is being tilted, and to restore the door to closed position when the bin is returned to its normal horizontal position.

Still other features embody power actuated means for tilting the bin to discharge position.

Figure 2:
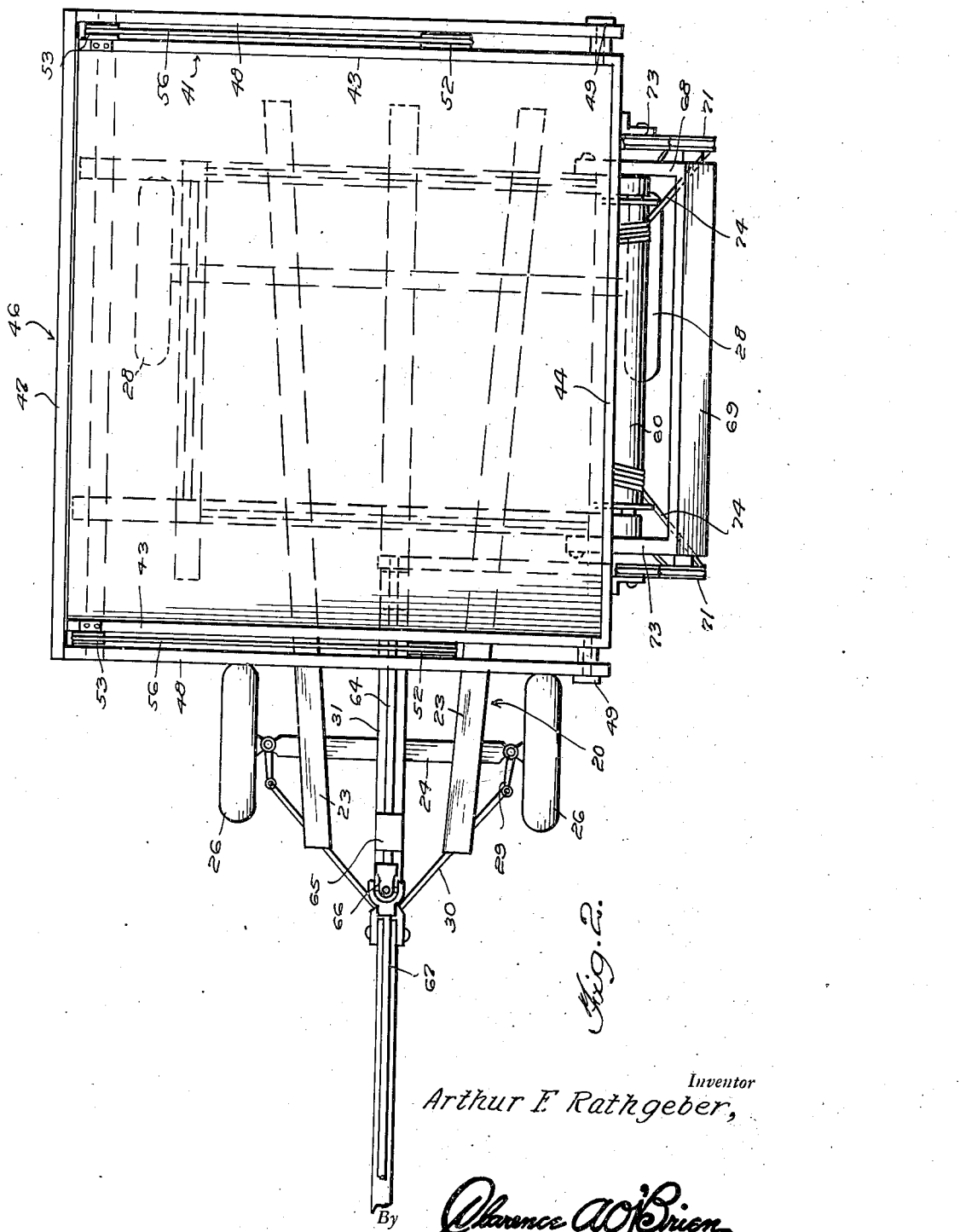
Figure 3:
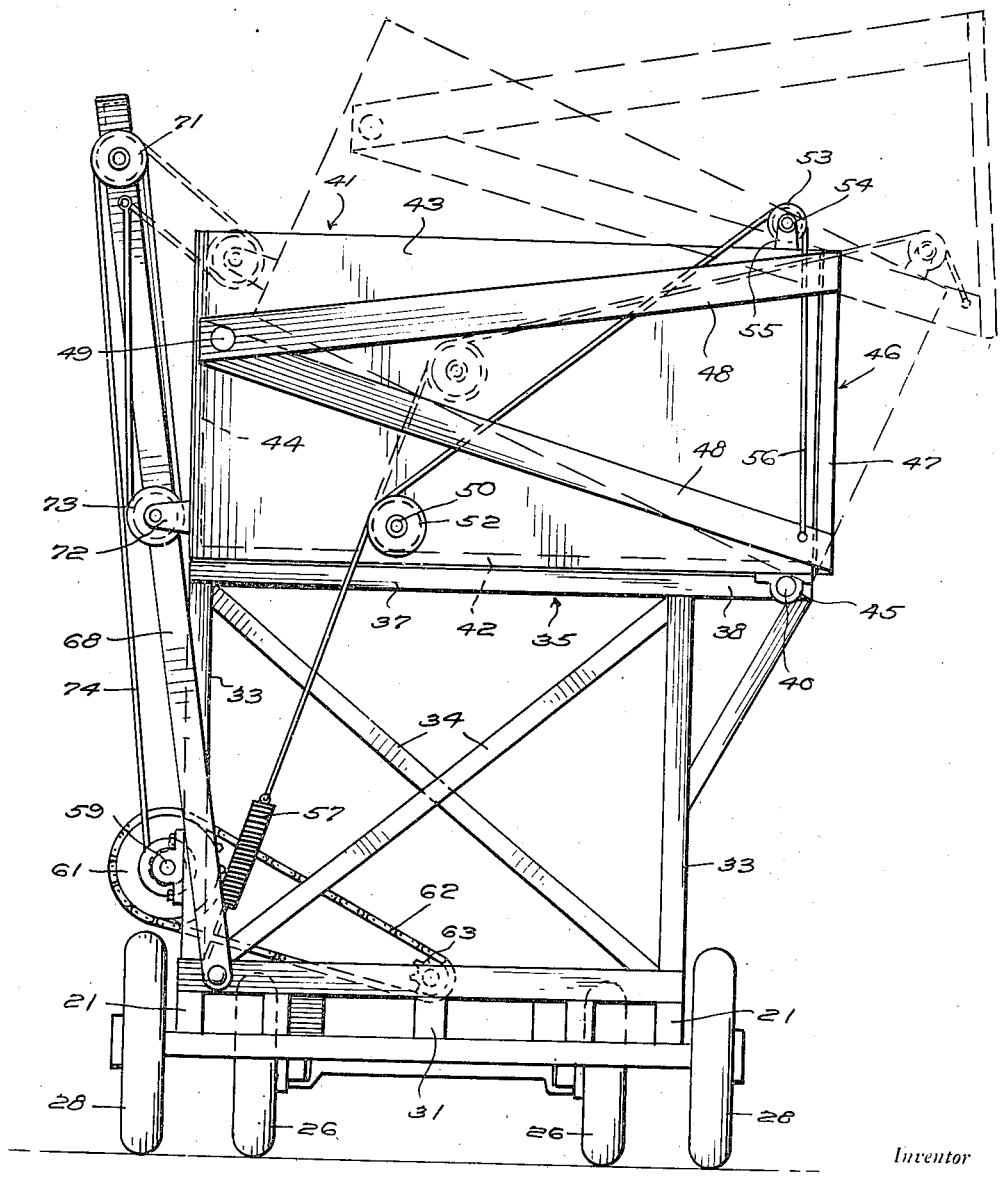
Figure 4:
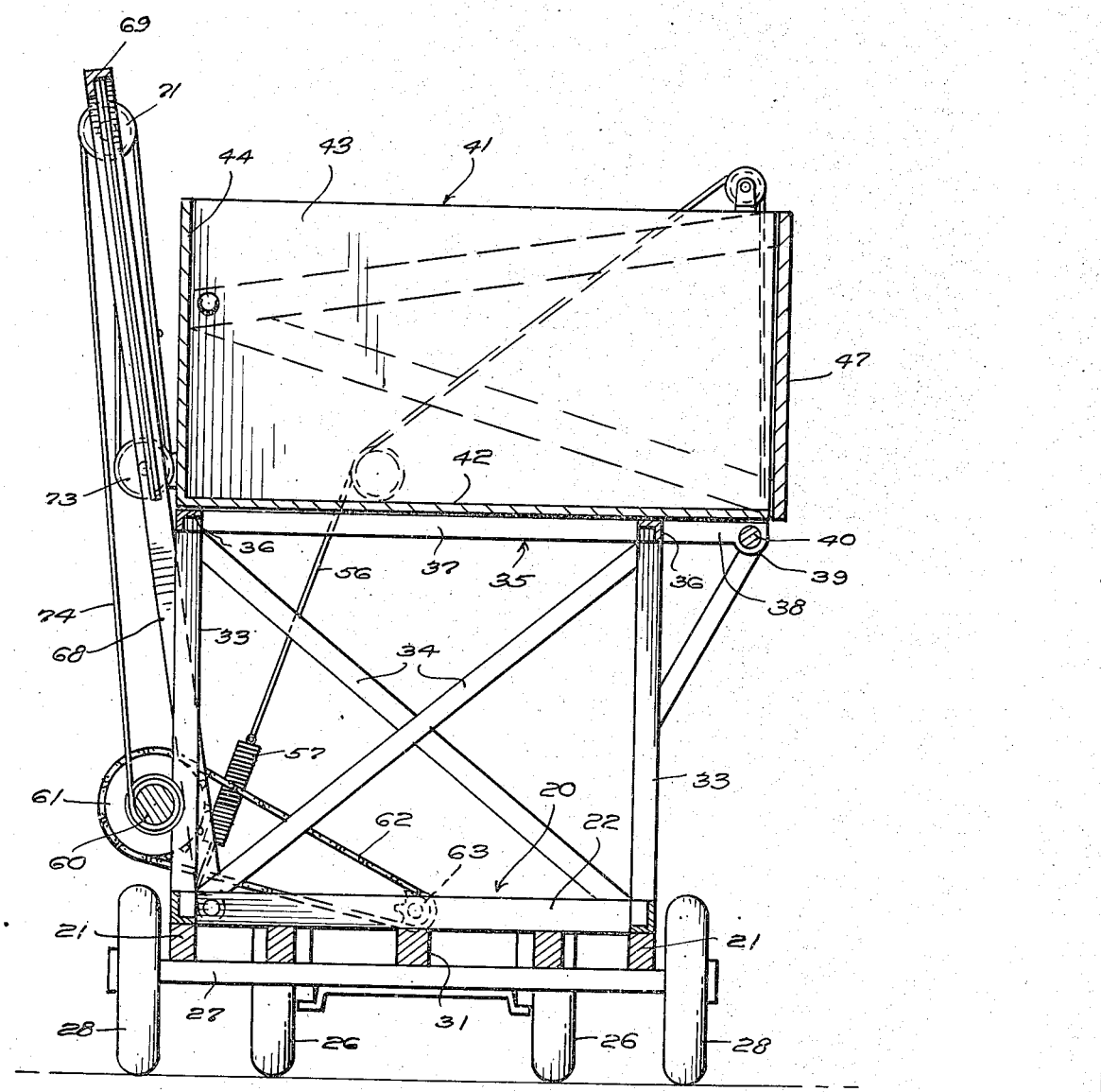
Figure 5:
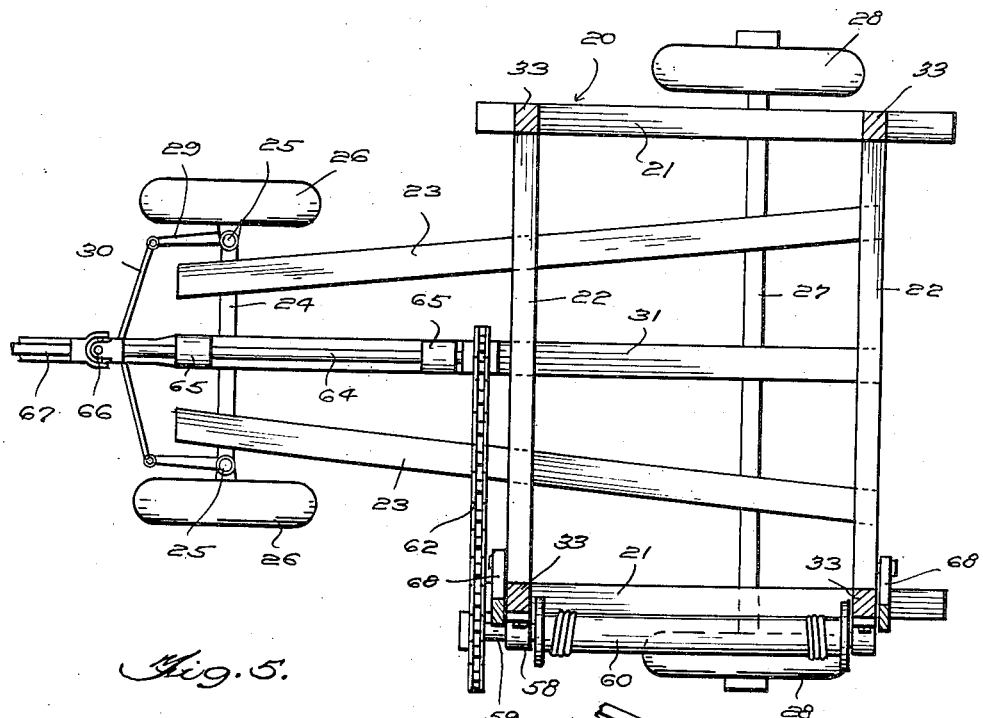
Figure 6:
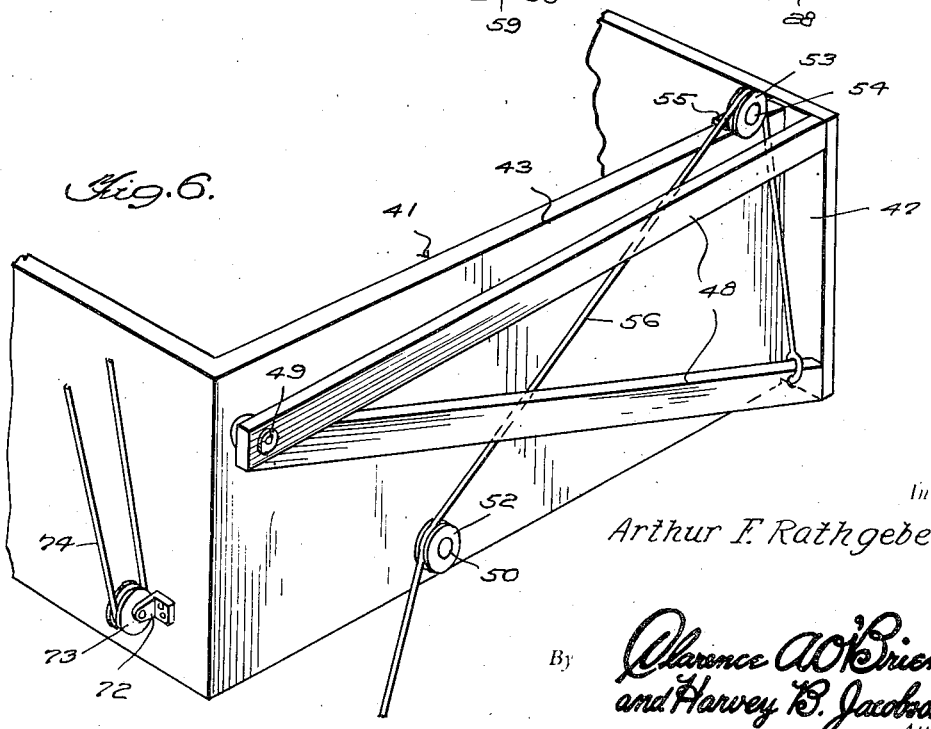

In the drawings:

Figure 1 is a side view of a silage rack embodying the features of this invention, Figure 2 is a top plan view of Figure 1, Figure 3 is a rear end view of Figure 1, Figure 4 is a transverse sectional view through the silage rack illustrated in Figure 1, Figure 5 is a horizontal sectional view taken substantially on the line 5—5 of Figure 1, Figure 6 is a fragmentary perspective view of the bin showing the door mounting and actuating means, Figure 7 is a side view of a modified form of this invention, Figure 8 is a rear end view of Figure 7, and Figure 9 is a diagrammatic plan view of the hydraulic control for the bin elevating mechanism employed in the structure illustrated in Figures 7 and 8.

Referring to the drawings in detail, a chassis or frame designated generally 20 comprises a pair of spaced parallel side rails 21 joined adjacent opposite ends by transversely extending parallel rails 22. Extending between the rails 22 in spaced relation to the side rails 21 are convergent rails 23 which are joined adjacent their forward convergent ends by a transversely extending axle 24 provided with suitable knuckle joints 25 carrying wheel spindles upon which the forward supporting wheels 26 are rotatably mounted. A rear axle 27 extends transversely between the side rails 21 and rotatably mounted at opposite ends of said axle 27 are supporting wheels 28 upon which the rear end of the chassis 20 is supported. Extending forwardly from the knuckles 25 are steering arms 29 which are joined at their forward ends by a suitable tie rod 30 by which the wheels 26 may be moved in unison around their respective knuckle joints 25. Extending longitudinally of the chassis midway between the side rails 21 is a tongue 31 to the forward end of which is attached a draw-bar 32 which is adapted to be connected to the rear end of a silage cutter (not shown). The tie bar 30 is so connected to the draw-bar 32 that when the leading vehicle, or silage cutter makes a turn the wheels 36 will be moved in unison so as to cause the silage rack to accurately follow the silage cutter.

Extending upwardly from the side rails 21 of the chassis 20 adjacent their forward and rear ends are columns 33 which are rigidly supported against the side and end movement by means of cross braces 34. A bin supporting frame designated generally 35 is mounted on the upper ends of the columns 33 and comprises spaced parallel side rails 36 which are joined at opposite ends to transversely extending end rails 37, the ends 38 of which overhang one side of the chassis 20 as will be readily seen upon reference to Figures 3 and 4. Supported in suitable bearing brackets 39 carried by the adjacent overhanging ends 38 of the transversely extending bars 37 is a pivot shaft 40 to which the silage bin designated generally 41 is pivotally connected. The silage bin 41 above referred to comprises a bottom 42 carrying at opposite side edges vertically extending side walls 43 which are joined at one end by an end wall 44. Secured to the underside of the bottom at the end opposite the end walls 44 are bearing brackets 45 which surround the shaft 40 to pivotally attach the bin 41 to the frame 35, as will be readily understood upon reference to Figure 3. It will thus be seen that the bin 41 is open at one side so that as the closed end of the bin is elevated it will swing about the pivot shaft 40 to discharge the contents of the bin.

In order to close the open side of the bin 41 when the same is in normal horizontal position on the frame 35, I provide a door mechanism designated generally 46 comprising a door 47 which is substantially coextensive with the open side of the bin and attached to the door at opposite ends are convergent bars 48 which are pivotally attached at their convergent ends as at 49 to opposite sides 43 of the bin 41. Rotatably mounted on suitable trunnions 50 carried by opposite sides 43 of the bin 41 near the bottom 42 and intermediate the end wall 44 and the door 47 are idler pulleys 52 which cooperate with guide pulleys 53 which are rotatably mounted as at 54 in suitable brackets 55 carried by the side walls 43 of the bin 41 adjacent their upper edges and near the ends adjacent the door 47. A cable 56 is attached at one end to the lowermost bar 48 adjacent its lower end and this cable is trained over the guide pulleys 53 and idler pulley 52 as will be readily appreciated upon reference to Figure 3. The ends of the cable 56 opposite to that which is attached to the rail 48 is attached to a retractile coil spring 57, the opposite end of which is anchored in any suitable manner to the chassis 20. It will be understood that such a cable and roller arrangement is provided on each side wall 43 of the bin 41 so that the bin is tilted as suggested by the dotted lines in Figure 3, the door 47 will be moved to open position.

Rotatably mounted in suitable bearings 58 mounted on the columns 53 opposite those adjacent which the end of the bin is pivoted is a drive shaft 59 carrying a winding drum 60 and attached to one end of the drive shaft is a drive sprocket 61 over which a drive chain 62 is trained. This chain has driving connection with a sprocket 63 which is mounted at one end of a main drive shaft 64, which is journaled in suitable bearing 65 carried by the tongue 31, and this shaft 64 is connected to a suitable universal joint 66 with the power take-off shaft 67 of the leading vehicle or silage cutter. Secured to the chassis 20 adjacent opposite ends of the shaft 59 are standards 68 which are joined at their upper ends by a horizontally extending bar 69 and are held in rigid relation by cross braces 70. Rotatably supported adjacent the upper ends of the standard 68 are elevating pulleys 71, and attached to suitable brackets 72 carried by the bin 41 adjacent the lower edge of the rear wall 44 are pulleys 73. A cable 74 is attached to each standard 68 near its upper end and extends downwardly around each pulley 73 and thence upwardly over its respective elevating pulleys 71 from which the cable extends downwardly and is attached to the drum 60 so that upon rotation of the drum in a direction to wind the cable thereon a lift will be exerted on the pulleys 73 and transmitted through their respective brackets 72 to the bin 41 so as to move it into the dotted line position illustrated in Figure 3. It will thus be seen that the bin may be elevated to discharging position through the medium of the power take-off of the silage cutter and upon reverse motion of the drum 60 the bin may be restored to normal silage receiving position without in any way interrupting the progress of the cutting of the silage.

In the modification illustrated in Figures 7 to 9 inclusive, the chassis is designated generally 20' and carries the standard 33' which support at their upper ends a frame 35' to which is pivotally mounted as at 40' a bin designated generally 41'. The bin 41' corresponds in all details to the bin 41, previously described, and is provided with a door mechanism designated generally 46' which corresponds in all details to the door mechanism 46. In fact, the fundamental difference between the structure previously described and the one illustrated in Figures 7 and 9 inclusive resides in the substitution of hydraulic cylinders 75 which are pivoted as at 76 to the chassis 20' and are fitted with pistons to which piston rods 77 are connected for vertical movement with relation to the cylinder 75. The upper ends of the piston rods are pivotally attached as at 78 to suitable brackets 79 secured to the underside of the bottom of the bin 41' as will be readily understood upon reference to Figures 7 and 8. In order that the pistons within the cylinders 75 may be moved in unison under hydraulic pressure, a pipe 80 is connected to each cylinder adjacent its lower end and this pipe is connected through a suitable control valve 81 to the pressure line 82 of a suitable hydraulic system (not shown) which may be carried on the leading vehicle or silage cutter. The door 46' is opened in the same general type of mechanism employed in the structure previously described by means of the cable 56' operating over pulleys 53' and 52' and through the springs 57' which are attached as previously described to the chassis 20'.

In operation, it will be understood that as the bin 41 is moved to load discharging position through either the cable mechanism illustrated in Figures 1 through 6 inclusive or through the medium of the hydraulic mechanism illustrated in Figures 7 and 8, the roller 52 will move upwardly while the roller 54 moves outwardly so as to cause the door 47 to be opened as suggested by the dotted lines in Figure 3. Upon the return of the bin 41 to its normal horizontal position, the door 47 will close the open side of the bin to prevent the discharge of the contents until the next discharge operation is performed. Obviously, the cutting of the silage may progress uninterruptedly during the discharge of the bin as it is possible to drive a vehicle alongside the silage rack so that the latter will move in unison with the vehicle and discharge the contents of the bin 41 which may be effected in transit. Obviously, with the use of a device of this character much time and labor can be saved in the cutting and storing of the silage as the cutting need not be interrupted while the silage is being gathered and stored.

While in the foregoing there has been shown and described the preferred embodiment of this invention it is to be understood that minor changes in the details of construction, combination, and arrangement of parts may be resorted to without departing from the spirit and scope of the invention as claimed.

I claim:

A portable silage rack adapted to cooperate with a field silage cutter to receive the silage as it is being cut comprising a wheel supported bed, a pivot shaft mounted on the bed and lying along a horizontal axis which lies parallel with the longitudinal axis of and in vertically spaced relation to the bed, a bin pivotally supported at one side edge of its bottom on the pivot shaft to swing in a vertical arc above the bed, means for tilting the bin about the horizontal axis into load discharging position, said bin being open along the side adjacent the pivot shaft, a door pivotally supported adjacent the side of the bin remote from its open side, said door closing the open side of the bin when the latter is in load receiving position, a sheave mounted to rotate on the end of the bin adjacent its bottom and between opposite sides thereof, a guide pulley mounted on the end of the bin near its upper edge and adjacent the side having the door opening, a cable anchored at one end to the door and trained over the guide pulley and the sheave, and the opposite end of the cable being yieldingly connected to the vehicle bed whereby when the bin is tilted to discharge the contents thereof the door automatically will be moved to open position with relation to the open side of the bin.

ARTHUR FRED RATHGEBER.

REFERENCES CITED

The following references are of record in the file of this patent:

UNITED STATES PATENTS

| Number | Name | Date |
|---|---|---|
| 987,121 | Ditmer | Mar. 21, 1911 |
| 1,090,338 | Payer | Mar. 17, 1914 |
| 1,109,132 | Lowney | Sept. 1, 1914 |
| 1,368,931 | Hokanson | Feb. 15, 1921 |

FOREIGN PATENTS

| Number | Country | Date |
|---|---|---|
| 22,860 | Australia | June 1, 1936 |